July 23, 1963    A. LIEBSCHER ETAL    3,098,308
FOOTWEAR HAVING AN OUTSOLE OF ELASTOMERIC
MATERIAL CURED DIRECTLY TO THE SOLE
Filed Aug. 15, 1957
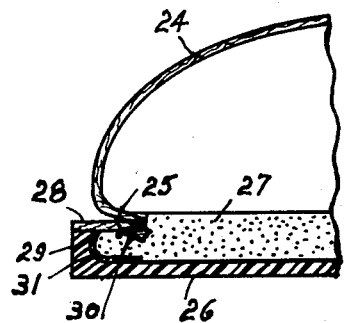
INVENTOR.
BY _United States Patent Office_  3,098,308
Patented July 23, 1963

3,098,308
FOOTWEAR HAVING AN OUTSOLE OF ELASTOMERIC MATERIAL CURED DIRECTLY TO THE SOLE
Anton Liebscher, Ernest E. Rollman, and Andrew S. Szerenyi, Waynesville, N.C., assignors to Ro-Search, Inc., Waynesville, N.C.
Filed Aug. 15, 1957, Ser. No. 678,412
2 Claims. (Cl. 36—14)

This invention relates to footwear and more particularly to footwear having an outsole of moldable non-porous rubber or equivalent material which constitutes the wear surface of the footwear which is directly secured to the upper.

Many attempts have been made to produce inexpensive footwear wherein the sole is vulcanized or otherwise directly bonded to the upper. Such footwear is disclosed in some of our prior patents, such as Szerenyi et al. Patent 2,129,106, Rollman Patent 2,574,582, Rollman et al. Patent 2,580,245, Rollman Patent 2,694,871 and Rollman Patent 2,789,295. The footwear disclosed in said patents is commercially acceptable and is inexpensive to manufacture, and includes an upper, a wear-resistant outsole and an intermediate filler of porous rubber material. The bond between the upper and the sole is, in each instance, however, between the upper and porous rubber material. As the porous rubber material does not have the strength of non-porous material, the bond is not too satisfactory and after the footwear had been in use, the bond might rupture.

Prior to our aforementioned patents, the customary manner of securing a non-porous rubber outsole to an upper was to first mold the outsole and thereafter secure the same to the upper or to an insole by means of an adhesive. The adhesive bond was not as satisfactory as the bond disclosed in the aforementioned patents.

The principal object of the present invention is to provide inexpensive footwear having an upper and an outsole of moldable non-porous elastomeric material which constitutes the wear surface of the footwear which is vulcanized or otherwise cured directly to the upper for permanently securing the outsole to the upper.

Another important object of the invention is to provide inexpensive footwear having an upper and a moldable non-porous elastomeric material forming the wear surface of the footwear which is vulcanized or otherwise cured directly to the upper and wherein a porous elastomeric filler is positioned between the bottom of the outsole and the upper.

The footwear hereinafter described may be produced in accordance with the teachings of our copending applications Serial Nos. 224,607 and 224,608, filed September 17, 1962, which applications are divisions of the instant application.

Briefly, the method disclosed in copending application Serial No. 224,607 includes the steps of placing a moldable plastic material which is capable of forming a non-porous outer surface and a porous inner filler into a mold cavity together with a shoe upper and reducing the volume of the mold cavity to exert pressure on the moldable plastic material for a sufficient length of time to form the outer sole shell and to mold the outer sole shell directly to the upper, and thereafter enlarging the volume of the cavity to permit the inner portion of the plastic material to expand and cure to a porous filler. The moldable plastic material may be of any elastomeric material such as rubber, both natural and synthetic, or equivalent thereof. The moldable plastic material filled into the mold may be of a single composition so long as it is capable of forming a porous filler, or it may be of two or more compositions, with the inner portion of the plastic mass having a blowing agent incorporated in the same.

The footwear resulting from the aforementioned method is disclosed in the single figure of the drawing which is a fragmentary sectional view.

In the drawing, reference numeral 24 indicates the upper having a lower portion 25. A welt 28 may be secured to the upper by stitching 30, although the same may be formed integrally therewith. The outsole 26 which forms the wear surface of the footwear has an integral upstanding rim 29 formed around the periphery thereof and the rim 29 is vulcanized in situ or otherwise cured directly to the welt 28 forming an effective bond between the rim and the upper, thus securing the outsole 26 to the upper. A filler 27 in the form of a porous elastomeric material such as rubber or its equivalent is positioned between the bottom portion of the outer sole and the upper, and is formed integrally with the outsole 26 and the rim 29 and is secured thereto and to the upper by means of vulcanization or curing. If desired, a strip 31 of non-moldable material such as prevulcanized rubber may be positioned in the mold to control the flow of the porous rubber filler 27 during the molding and to separate the filler from the non-porous rim.

The footwear thus described includes an outer wear surface, both on the bottom and the marginal edges, which is of non-porous plastic material which is wear-resistant, and the upstanding rim thereof has a secure bond directly to the upper, which bond is far stronger than if the bond was effected solely to the porous filler 27. The footwear is inexpensive to manufacture and is far superior in wearing qualities to the footwear disclosed in our previously mentioned prior patents.

A standard rubber mix for molding of soles directly to the upper might consist of the following components:

| | Parts |
|---|---|
| Pale crepe | 100 |
| Zinc oxide | 6 |
| Vegetable fibre | 40 |
| Lithopone | 35 |
| Magnesium carbonate | 7½ |
| Wood rosin | 2 |
| Petroleum jelly | 2 |
| Stearic acid | 1 |
| Vulcanizing agents | 4½ |

Such mix, cured 15 minutes at 302° F., produces a sole with a specific gravity of 1.36, a Shore hardness of 58 and an abrasion resistance (Du Pont) of 8 ccm. loss per hour. A molding pressure of 300 p.s.i. is necessary to assure complete filling of the mold and adhesion of the rubber to the upper.

According to the invention the sole is molded from a mix of the type as follows:

| | Parts |
|---|---|
| Smoked sheet | 50 |
| High styrene butadiene copolymer (such as sold under the designation of Polysar SS–250 by the Polymer Corporation of Canada) | 50 |
| Zinc oxide | 4 |
| Calcium silicate | 75 |
| Stearic acid | 1 |
| Vulcanizing agents | 6½ |
| AC Polyethylene (as sold by Allied Chemical Co., N.Y.) | 7 |

A cure of 8 minutes at 316 deg. F. produces a sole with a specific gravity of 1.28, a Shore hardness of 93 and an abrasion resistence of 1.7.

A molding pressure of less than 300 p.s.i. is permissible for the above described rubber mix, as the flow quality during molding was increased about 30%. It was found that substantial quantities of the low molecular weight polyester can be added to the mix, in proportions from 10 to 75% of the high styrenebutadiene copolymers, without reducing essentially the desired high hardness of the vulcanized sole.

The integrally molded shell soles with filler described above adhere very well when molded to uppers of leather or canvas. If the uppers consist of synthetic material, such as closed fabric from acrylic threads or vinyl sheeting, it has been found that rubber-like elastomers do not adhere always satisfactorily. The invention provides then that at least the mix for molding of the sole shell contains a very high percentage of low molecular weight polymers which are derivatives of di-isocynate. The other parts of the mix for the sole shell might then consist essentially of other elastomers be they compatible or not compatible with the material of the upper.

The following is an example of a satisfactory mix for the forming of a sole molded directly to an upper:

A pre-polymer mix is prepared, comprising:

100 parts polyester resin (such as sold as Paraplex AP 148 by Rohm & Haas, Philadelphia)
35 parts of toluene di-isocyanate (such as sold as Hylene TM by Du Pont, Wilmington)
1 part emulsifying agent
1.3 parts catalyst (N-methyl morpholine)
2.4 parts water The prepolymer mix and the catalyst mix are combined in the proportion 135 to 4.7 and filled into the mold. Only enough pressure is required to assure the complete filling of the details of the mold cavity, and the mixture is self-curing.

In view of the costs it is desirable to use smaller amounts of poly-isocyanates and it has been found that as little as 5% of it added to the mix will assure adherence to uppers of synthetic material. Further savings are obtained by providing that only the outer shell of the sole contains poly-isocyanates in the manner as described above, for the manufacture of shell soles molded integrally with a filler.

The term "rubber material" used in the claim is intended to include any natural or synthetic rubber composition or its equivalent, and the term "vulcanized" used in the claim is intended to include vulcanization by heat and pressure, as well as self-curing.

We claim:

1. Footwear comprising an upper, a outsole of thin moldable non-porous rubber material having a substantially flat portion constituting the wear surface of the footwear and an integral upstanding rim extending around the periphery thereof, and a filler of porous rubber material between the bottom portion of said outsole and upper formed integrally with said outsole and secured to said upper, said rim being molded and vulcanized in situ around said filler and directly to said upper for securing said outsole to said upper.

2. Footwear as set forth in claim 1 further including a strip of material positioned between said rim and said filler.

References Cited in the file of this patent

UNITED STATES PATENTS

| | | |
|---|---|---|
| 2,129,106 | Szerenyi | Sept. 6, 1938 |
| 2,210,753 | Field | Aug. 6, 1940 |
| 2,454,486 | Stanton et al. | Nov. 23, 1948 |
| 2,574,582 | Roleman | Nov. 13, 1951 |
| 2,580,245 | Rollman et al. | Dec. 25, 1951 |
| 2,600,942 | Vanacker | June 17, 1952 |
| 2,687,554 | Root | Aug. 13, 1954 |
| 2,694,871 | Rollman | Nov. 23, 1954 |
| 2,786,237 | Keen et al. | Mar. 26, 1957 |
| 2,789,295 | Rollman et al. | Apr. 23, 1957 |
| 2,795,822 | Long | June 18, 1957 |
| 2,818,404 | Hill | Dec. 31, 1957 |

FOREIGN PATENTS

| | | |
|---|---|---|
| 469,555 | Italy | Mar. 11, 1943 |
| 866,013 | Germany | Feb. 5, 1953 |
| 207,484 | Australia | Apr. 3, 1957 |